3,148,328
FREQUENCY DETECTOR INCLUDING NOISE
REJECTION MEANS
Thomas A. Murrell, Urbana, and Ralph R. Henry, Decatur, Ill., assignors to Muni Quip Corporation, Decatur, Ill., a corporation of Illinois
Filed Nov. 17, 1961, Ser. No. 153,043
12 Claims. (Cl. 324—78)

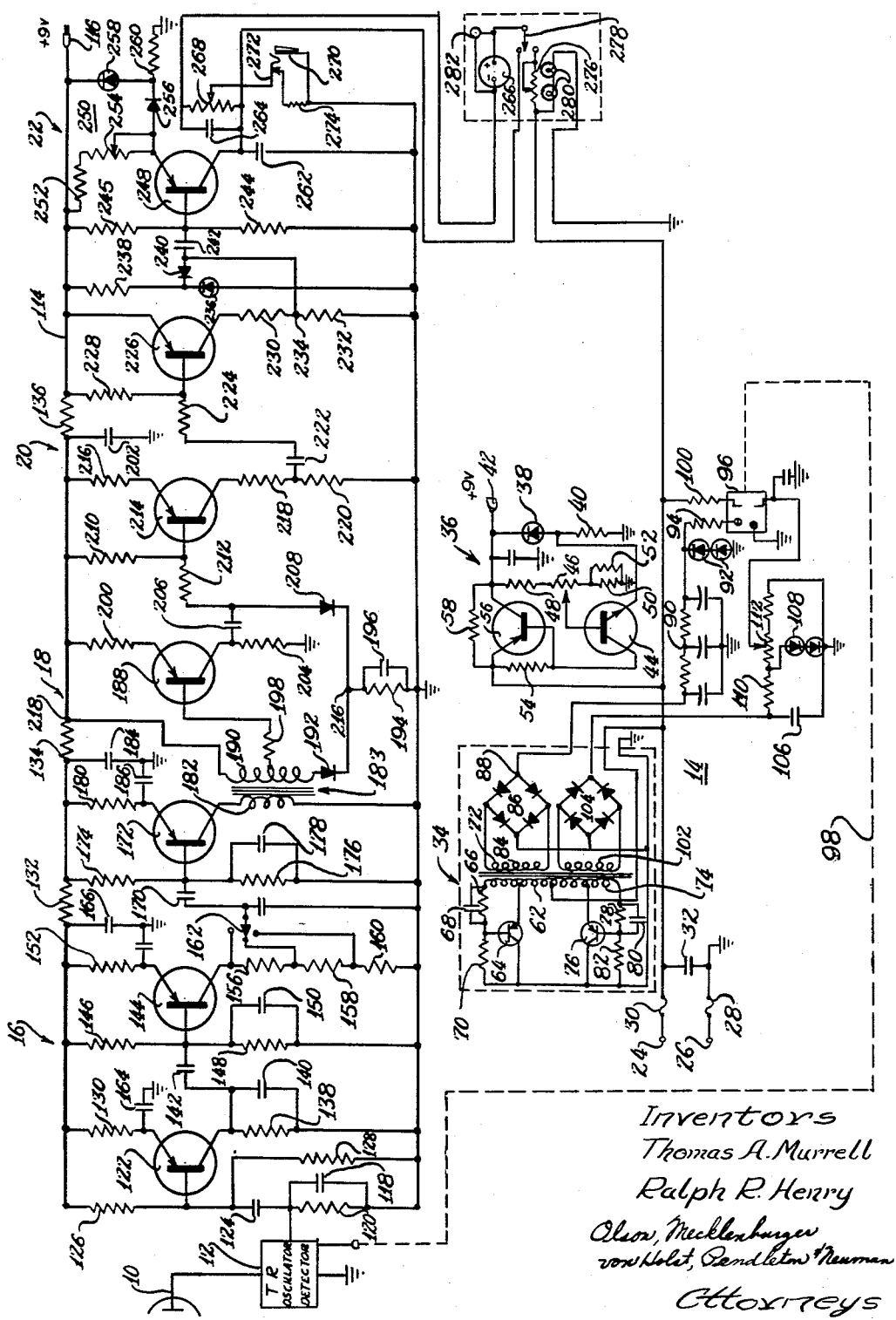

This invention relates to electronic circuit apparatus and more particularly to an improved circuit for amplifying a selected periodic signal, rejecting noise and low level signals and determining the frequency of the selected signal.

In regulating automotive traffic, devices generally termed traffic radar have been extremely useful. The devices are usually mounted on police vehicles and operate from a conventional battery supply. The vehicle is positioned adjacent a relatively straight highway section and directs a concentrated beam of high frequency energy generally parallel to the highway and in the direction of oncoming traffic. While the beam may be directed toward departing traffic, this is not the preferred arrangement as it makes vehicle identification more difficult.

The frequency of operation for such systems of traffic radar is in the kilomegacycle range and the microwave energy is generated in a relatively simple high frequency oscillator such as a klystron circuit. The energy is concentrated in a narrow beam only a few degrees wide by appropriate antenna, such as a pair of dielectric rods, a set of dipoles, a parabolic reflector or the like. The beam of energy is reflected from an oncoming vehicle and received either by the same or an adjacent antenna. As is now known, the reflected energy when received at the antenna has a frequency equal to the transmitted frequency plus a factor directly proportional to twice the speed of the oncoming vehicle. This frequency changing phenomenon is known as the Doppler effect. A portion of the transmitted signal and the received signal are immediately compared in a crystal mixer or the like where an audio signal having a frequency equal to the difference between the transmitted and received signals and proportional to vehicle speed is produced. The mathematical relationship is $$V = Cf_d/2f_0$$

where V is the velocity of the vehicle, C is the velocity of propagation of the radar wave, $f_0$ is the frequency of the transmitted signal and $f_d$ is the Doppler frequency or difference between the transmitted and received signals. The audio Doppler signal in the preferred form of the invention is then amplified and used to generate a meter indication directly related to audio frequency. A circuit is provided to reject audio signals below a predetermined level and low level noise while passing signals of sufficient magnitude to accurately operate the frequency circuit. In the described embodiment of the invention the system is adapted to indicate automobile velocities in the range of 10 to 100 miles per hour. For this range of vehicle speeds the Doppler frequencies are in the order of 300 to 3000 cycles per second for about a 10 kilomegacycle signal.

Such traffic radar heretofore available have created excessive drains on batteries and power supplies, have shown undesirable response to low level noise and weak signals and have employed complicated or inaccurate systems for converting Doppler frequencies into meter indications.

It is therefore one object of this invention to provide an improved traffic radar including a unique amplifier and indicator which is simple and yet accurate.

It is another object of this invention to provide an improved amplifier for traffic radar systems and the like having a quickly responsive threshold circuit for rejecting low level signals and noise while passing signals having strength above a predetermined level.

It is still a further object of this invention to provide an improved amplifier and frequency indicator which is free of vacuum tubes, is highly efficient and employs a unique transistorized power supply.

Another object of this invention is the provision of a unique indicating circuit for converting the frequency of an incoming signal into meter deflection.

Further and additional objects of this invention will become manifest from a consideration of this description, the accompanying drawings and the appended claims.

In one form of this invention an amplifier, threshold circuit frequency indicator and power supply are combined into a single integral unit having improved response and reliability with low power requirements. The threshold circuit is designed to reject small signals and noise while amplifying signals above a predetermined level as controlled by a unique feedback system. The signals passed by the threshold circuit are applied to a detecting circuit responsive only to acceptable signals where those signals are shaped and differentiated and utilized in an indicating circuit for producing meter deflection directly proportional to frequency.

For a more complete understanding of this invention reference will now be made to the accompanying drawing wherein:

FIG. 1 is a circuit diagram of the electronic circuit apparatus of this invention.

In the drawing a microwave antenna 10 is schematically indicated connected to a transmitter-receiver 12 which is shown in block form. The transmitter-receiver 12, as well as the remaining circuits to be described, is energized from a semiconductor power supply 14. The transmitter-receiver 12 includes a mixer and produces an audio output which is applied to an amplifier 16, a threshold circuit 18, a further amplifier 20 and an indicator circuit 22. The entire system requires very little input energy and is efficient and trouble-free as a result of the use of semiconductor devices throughout.

Terminals 24 and 26 are connected to a conventional source of energy, such as an automotive battery or the like. This source may have a voltage in the order of 12 volts, not to exceed about 15 volts, in the described embodiment. The battery terminal 26 is connected to ground through a fuse 28, and the battery terminal 24 is connected to the power supply and other components through a fuse 30. A very large capacitor 32 in the order of 1000 mfd. is applied between the battery terminals to avoid possible feedback of spurious signals into the battery.

Power supply 14 includes a high voltage generator and rectifier 34 and a regulated 9 volt supply 36. The regulated supply is a two-transistor circuit employing a zener diode 38 as a reference. Zener diode 38 is in series with resistor 40 across the output of the regulated supply between output socket 32 and ground. As is well known, zener diodes are semiconductor devices which exhibit a nondestructive athermal breakdown when a predetermined inverse voltage is applied and the devices maintain a very constant voltage drop when in the athermal breakdown region for a wide range of inverse current. Thus any change in voltage at socket 42 will produce a change in current through the sensing network including the zener diode 38 and resistor 40, although the entire change in voltage will appear across resistor 40. The juncture of resistor 40 and zener diode 38 is applied to the emitter of an NPN transistor 44, the base of which is connected to the wiper of a potentiometer 46. Potentiometer 46 is connected in a voltage divider circuit including resistor 48, resistor 50 and thermistor 52. Potentiometer 46 is adjusted so that with 9 volts appearing at plug 42 a small positive bias is applied to transistor 44 producing quiescent base current. This, in turn, produces collector current from the unregulated battery supply through resistor 54 and transistor 44 to ground. Resistor 54 is in the base circuit of transistor 56, and thus any increase in collector current in transistor 44 produces a reduced voltage on the base of transistor 56. This produces an increase in the collector current of transistor 56 which in turn raises the voltage at socket 42. A bypass resistor 58 is provided in parallel with the emitter and collector terminals of transistor 56 whereby the regulating action of transistor 56 is initiated even though the leakage current is small. A large capacitor 60 in the order of 100 mfd. provides isolation of the power supply from the remaining circuits.

The high voltage supply 34 is also energized from the battery which is connected to terminals 24 and 26. A large transformer primary winding 62 is energized at its center tap from battery terminal 24. Winding 62 actually comprises two separate and distinct high voltage primaries which will be considered separately. Extending upwardly from the center tap, winding 62 is connected to the emitter of transistor 64 which is connected in an oscillator circuit. The collector of transistor 64 is connected directly to ground. A portion of winding 62 is connected to the base of transistor 64 through a phase shifting network including resistor 66 and capacitor 68. The base of transistor 64 is connected to ground through resistor 70. Energization of winding 62 produces positive current flow therethrough and through transistor 64 to ground. This current is augmented by the induced positive signal in the winding portion 72 which is applied through the network including resistor 66 and capacitor 68 to bias the transistor 64. As the collector current begins to stabilize at a predetermined high value, the induced voltage and current in winding portion 72 is reduced, removing the forward bias from transistor 64, producing diminished collector current. This produces a diminishing field and consequently a negative induced voltage on the transistor base and consequently still less current flow in the collector circuit until the transistor is substantially cut off. Again stabilization of current eliminates the negative bias and produces repetition of the action and stable oscillations. The lower half of transfromer 62 including feedback portion 74 is connected in an identical circuit whereby the collector circuit of transistor 76 conducts substantial current until the induced field in feedback winding portion 74 begins to stabilize, at which time a feedback signal through resistor 78 and phase shifting capacitor 80 diminishes collector current flow resulting in stable oscillation. The base of transistor 76 is biased for conduction through resistor 82.

Transformer secondary winding 84 is connected to a diode bridge rectifier 86 which produces a high positive voltage at terminal 88 with respect to ground. This positive voltage is filtered in network 90 and is regulated by shunt zener diodes 92 which provide a 300 volt regulated supply through resistor 14 at one terminal of plug 96. Plug 96 is connected by a cable diagrammatically indicated by broken line 98 to the transmitter-receiver 12 where the 300 volt power is employed for energization of the klystron. An unregulated 9 volt supply for the klystron heater is also available through plug 96 and resistor 100 from battery terminal 44. A second secondary winding 102 provides high voltage for a diode bridge rectifier 104 which is filtered by condenser 106 and regulated by zener diode regulators 108. This supply is connected to plug 96 through resistor 110 and potentiometer 112 which provides a variable D.C. voltage of approximately 300 volts at the remaining terminal of plug 96.

The regulated 9 volt supply available at socket 42 is applied to a D.C. bus 114 through plug 116. Bus 114 provides power for the amplifier, threshold circuit, and indicating circuit. The audio output of the crystal mixer of block 12 having a frequency of between about 300 and 3000 cycles is applied from the mixer across a network including capacitor 118 and resistor 120. The signal is coupled to the base of a PNP transistor 122 through coupling capacitor 124. The base is biased by resistors 126 and 128 for quiescent conduction and consequently linear operation over a substantial range of signal inputs. The emitter of transistor 122 is connected to bus 114 through an emitter resistor 130 and line resistors 132, 134 and 136. By proper selection of resistors 126, 128 and 130, small quiescent bias current will flow. Emitter quiescent current will flow from bus 114 through resistor 130 into transistor 122, base quiescent current will flow from the transistor through resistor 128 to ground and collector quiescent current will flow from the transistor through resistor 138 to ground. When an audio signal is applied to the base of transistor 122 positive excursions of base voltage will result in reduced current in both the emitter circuit including resistor 130 and the collector circuit, including resistor 138. The result is that the voltage appearing across resistor 138 will fall. Conversely, negative excursions of base voltage result in increased conduction and a positive change in the voltage appearing across resistor 138. As is well known, if the magnitudes of the resistors are properly chosen, amplification takes place, and the voltage excursions appearing across resistor 138 are considerably larger than the voltage excursions applied to the base of the transistor. A small capacitor 140 is connected in parallel with resistor 138 for low frequency compensation whereby the effect of coupling capacitor 124 and any other low frequency losses can be compensated.

The signal appearing across resistor 138 is applied through capacitor 142 to the base of a second transistor 144. The base of transistor 144 is connected to the intermediate point of a voltage dividing network including resistors 146 and 148. Capacitor 150 is in parallel with resistor 148 for frequency compensation. Transistor 144 is so biased by these networks that small bias currents flow in the emitter base and collector leads of the transistor 144. Thus while quiescent emitter current is flowing through resistor 152, base current flows through resistor 148 and collector current flows through resistors 156, 158 and 160. A rotary switch 162 has a wiper adapted to engage one of three contacts so connected that any desired portion of the output voltage of the second transistor stage may be selected for further amplification. Switch 162 constitutes a range selector operating in conjunction with the threshold circuit 18. Thus for the shortest range of operation switch 162 will be in the lowest position, whereby only the voltage appearing across resistor 160 will be applied to subsequent stages and the signal strength would be sufficient to activate the threshold circuit only when the target vehicle is quite close to the transmitter. In the middle position of switch 162 the voltage appearing across both resistors 160 and 158 is applied to subsequent stages comprising a middle range with higher overall gain and activation of the threshold circuit for more distant vehicles. In the uppermost position of switch 162 the full output voltage of transistor 144 appearing across resistors 156, 158 and 160 is applied to subsequent stages giving maximum available range. Capacitors 164, 166 and 168 are bypass condensers used in the conventional manner. The wiper switch 162 is connected through coupling capacitor 170 to the base of transistor 172. The quiescent base voltage is determined by resistors 174 and 176 and base capacitor 178 provides low frequency compensation. The emitter is connected to the supply bus 114 through emitter-resistor 180, resistors 174, 176 and 180 being so selected that predetermined bias current flows in transistor 172. The steady state emitter current flows from the supply through resistor 180, and the collector current flows from transistor 172 through primary winding 182 of the step-up transformer 183. The step-up ratio of the transformer in the described embodiment is approximately 1.4 to 1. The emitter circuit includes bypass condensers 184 and 186.

The threshold circuit 18 is energized from transformer primary winding 182 and includes a transistor 188 and associated circuit components. The base of transistor 188 is biased for conduction by a network including transformer secondary winding 190, diode 192 and a parallel network of resistor 194 and capacitor 196. An intermediate point on transformer secondary 190 is connected to the base of transistor 188 through resistor 198 and the emitter of transistor 188 is connected to the supply through resistor 200. The magnitudes are so selected that there is quiescent current flowing in each of the terminals of transistor 188 whereby linear operation for small inputs is obtained. However, resistor 194 is quite large, in the order of 150,000 ohms, and thus the quiescent currents are very small, in the order of only a fraction of a milliampere.

For frequencies in the range of concern here, capacitor 196 will exhibit an impedance in the order of a few hundred ohms. Transformer secondary winding 190 also has a D.C. resistance in the order of 500 ohms and has an impedance in the frequency range of interest in the order of several thousand ohms. The upper terminal of secondary 190 is connected to bus 114 and is effectively grounded for A.C. signals by capacitor 202. In one embodiment capacitor 202 has a magnitude of 100 mfd. Thus, whenever diode 192 is positively biased, the secondary circuit is connected to a low impedance which is reflected into the primary circuit as a reduced impedance determined in part by the ratio of transformer 183. This low effective impedance of primary winding 182 constitutes a low collector impedance for transistor 172 and results in low gain for the amplifier stage including that transistor.

The output of transformer 183 is applied from a center tap through resistor 198 to the base connection of transistor 188. The emitter of transistor 188 is connected to bus 114 through resistor 200 and the collector is connected to ground through resistor 204. The output of this stage is applied through capacitor 206 and resistor 212 to a subsequent transistor 214. Resistors 210 and 212 comprise a voltage divider in cooperation with diode 208 and the network including resistor 194 and capacitor 196 whereby diode 208 is biased in the forward direction under quiescent conditions.

The collector impedance of transistor 188 includes capacitor 196, diode 208 and capacitor 206, and thus whenever diode 208 is forwardly biased, transistor 188 has a low effective A.C. collector impedance and consequently the gain of the amplifier including that transistor is also low for conditions of zero or low signals or in response to short duration noise signals.

Thus with proper selection of resistors 194, 198, 200, 210 and 212 in coordination with the characteristics of transistor 188 and transformer 183, the accumulated charge on capacitor 196 is continuously dissipated through resistor 194 at a rate such that diodes 192 and 208 remain positively biased for quiescent conditions, conditions of signal levels below a predetermined minimum, and in the presence of random or occasional noise. However, whenever the signal levels reach the predetermined minimum level, it is desirable that the amplification of the circuit increase suddenly and substantially. This is accomplished in the threshold circuit 18 through the change of bias on the diodes 192 and 208. When the signal applied to transformer 183 increases very slightly above the predetermined threshold value, the charge on capacitor 196 increases, charging the bias on diodes 192 and 208. As the diodes possess a rather sharp characteristic curve, the current therethrough diminishes very rapidly for a slight change in voltage at the critical value. Thus the effective impedance in the secondary circuit of transformer 183 rises very rapidly resulting in substantially increased gain in the amplifier stage including transistor 172.

Simultaneously diode 208 also exhibits a substantially increased impedance in the collector circuit of transistor 188 and consequently the gain of that stage also increases substantially. The combined effect of the increased gain of the two amplifier stages is to charge capacitor 196 still more positively as the capacitor is charged on each positive half cycle of the signal through both diodes 192 and 208, but discharge is limited to the time constant of the RC network including resistor 194 and capacitor 196. The voltage appearing at point 216 actually rises substantially above the voltage of the bus 114 and in practice has been found to be between 10 and 11 volts for typical signal conditions.

As long as a substantial signal is present, the capacitor will be continuously charged from the peaks of the signal and will keep the circuit "open." Very short interruptions in the signal—for example, loss of a few cycles—would not permit the threshold circuit to return to its quiescent state. Upon termination of a received signal, the capacitor 196 will discharge "closing" the threshold circuit so that subsequent noise and weak signals are rejected. This reset time may be in the order of a few tenths of a second.

The signal ratio as measured in the primary winding 182 is in the order of twenty to one; that is, when the signal level is below the threshold value, the voltage appearing across transformer primary 182 will have a very low value because of the low impedance in the secondary and the stages including transistors 172 and 188 will have very low gain. However, when the trigger circuit is actuated with the minimum signal required, the high impedance circuit for A.C. signals in the transformer secondary 190 and the increased gain of the stages will provide a voltage across transformer primary 182 of about twenty times the voltage measured at that point when the threshold circuit is closed.

The output of transistor 188 is applied through coupling capacitor 206 and resistor 212 to the base of transistor 214. The emitter circuit of transistor 214 includes resistor 216, and the collector circuit includes resistors 218 and 220 comprising a voltage divider. The output of transistor 214 is applied through coupling capacitor 222 and resistor 224 to a clipping transistor 226. The base of transistor 226 is connected to bus 114 by resistor 228 and the emitter is directly connected to bus 114 of the regulated supply. Since there is no D.C. path between the base of transistor 226 and ground, there can be no significant quiescent base current. As a result the quiescent emitter and collector currents will both be quite small.

For positive signal voltage excursions of a very small magnitude, coupled to the base of transistor 226 through coupling capacitor 222 and resistor 224, transistor 226 will be cut off reducing collector current to essentially zero, whereby the voltage at junction 234 will be essentially ground potential or zero. Conversely, for negative excursions of the periodic signal voltage coupled from the preceding circuit through capacitor 222 and resistor 224, the base current will increase producing greater collector current, thus substantially raising the potential of point 234. The point 234 is connected through a diode 240 to a network including a zener diode 236 and resistor 238. Zener diode 236 has an athermal breakdown value in the described embodiment of about 4 volts, and thus the voltage at the connection between diode 236 and resistor 238 is maintained at this value. As a periodic signal sufficient to open the threshold circuit is applied to the base of transistor 226, the transistor is cut off for positive excursions of the base voltage, but negative excursions cause the potential of point 234 to rise substantially above four volts. Thus for such positive excursions, diode 240 becomes positively biased and conductive, maintaining junction 234 at a level determined by zener diode 236 and only slightly above 4 volts. During the alternate portion of the signal the voltage of junction 234 goes to substantially zero in normal operation, and diode 240 is reversely biased and nonconductive. Thus a rectangular signal is applied to a differentiating network including small capacitor 242 and resistor 244. Resistor 230 is selected to limit collector current in transistor 226 to a reasonable value in the event large negative signals are applied to the base of transistor 226.

Resistor 244 is in a series resistive network with resistor 245 across the regulated supply and normally maintains the base of transistor 248 at a voltage of about 5 volts. Capacitor 242 and resistor 244 are so selected that the time constant of the differentiating network is in the order of 50 microseconds, considerably less than the period between two impulses of the highest frequency for which the circuit is designed, and thus alternate negative and positive spikes are produced corresponding to the leading edges of the respective negative and positive half cycles of the rectangular wave.

As already stated, the base of transistor 248 is normally biased at about 5 volts. The emitter of transistor 248 is biased by network 250 which includes resistor 252, variable resistor 254, diode 256, zener diode 258 and resistor 260. Zener diode 258 has an athermal breakdown in the described embodiment of about 5 volts whereby the voltage appearing across resistor 260 is about 4 volts. The emitter of transistor 248 is connected to bus 114 through resistors 252 and 254 and is connected to resistor 260 through diode 256. There is a potential drop of about .3 volt across diode 256, and thus the emitter of transistor 248 is maintained at about 4.3 volts under quiescent conditions and the transistor 248 is cut off with essentially zero base, emitter and collector currents. Positive impulses or spikes from capacitor 242 merely drive transistor 248 into cut-off while negative impulses or spikes of a few tenths of a volt from capacitor 242 produce base current in transistor 248, thus biasing the transistor for conduction and producing current in the collector rapidly charging collector capacitor 262.

In parallel with collector capacitor 262 is a large storage capacitor 264, a direct current meter 266 and potentiometer 268. The wiper of potentiometer 268 is connected to a jack 270 with a shorting contact 272, and the shorting contact is in turn connected to a grounded resistor 274. Jack 270 may be used to interconnect the circuit with a graphic recorder or the like. In the instant embodiment storage capacitor 264 has a capacitance of 50 mfd. and potentiometer 268 is a 2500 ohm device. Thus the positive spikes of voltage produce charging current in collector capacitor 262 and also produce charging current in storage capacitor 264 through the upper half of potentiometer 262 and resistor 274 to ground as well as through the lower half of potentiometer 268 and resistor 274 to ground. Capacitor 264 discharges through the parallel combination of meter 266 and potentiometer 268. This circuit provides the desired, relatively high impedance for the collector circuit of transistor 248 while matching the output circuit to the meter movement 266. The circuit also provides the desired filtering of the circuit output to produce optimum meter response to the impulses produced by the circuit. Each impulse produces a predetermined charge on capacitor 264, and the average current in meter 266 is determined by the periodicity of the impulses. A very accurate meter indication of frequency is thus provided. A standard resistor 276 is connected from the battery terminal 24 to one pole of a double throw switch 278 which is connected to one terminal of meter 266. Thus by actuating switch 276 the battery voltage can be measured. Lights 280 are provided for illuminating the meter face, and jack 282 is provided for measuring crystal current or the like with meter 266 when an appropriate cable is utilized.

While one particular embodiment of the invention has been described in substantial detail and that embodiment is especially adapted for use with a traffic radar system, it will be immediately apparent that the indicator circuit, the threshold circuit, the power supply and the unique combination of these elements with semiconductor amplifier circuits are useful in many applications and environments. For example, a thermistor network may be employed in series with resistor 246 to stabilize the output circuit whereby diodes 256 and 258 may be omitted.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

We claim:

1. Electronic circuit apparatus energized from a two terminal D.C. voltage source for amplifying and determining the frequency of periodic signals having magnitudes above a predetermined level, said apparatus comprising: regulator means for providing at an output terminal a predetermined voltage less than the voltage of the voltage source including a transistor having at least emitter, collector and base, means connecting one terminal of said voltage source to said output terminal through said emitter and collector, resistive means connected between said emitter and said collector, a sensing network including a zener diode and a resistor connected between said terminals, said base being operatively connected to said resistor, and bias resistor means between said emitter and said base; a source of periodic signals, amplifier means having an output and an input connected to said signal source to receive and amplify said periodic signals, said amplifier means being connected to the output terminal of said regulator means, a threshold circuit comprising a network including a resistor and a capacitor connected in parallel, said network having a time constant which is long in relation to the period of said periodic signals, first and second diode means each having a terminal of common polarity connected to one terminal of said network, threshold means connected to said regulator means having an input energized with said amplified periodic signal from said amplifier means and having a threshold amplifier output, said second diode means being operatively connected to said threshold amplifier output, said threshold amplifier being operatively connected to said network through said first diode means.

2. Apparatus energized from a D.C. voltage source for measuring the frequency of a periodic signal comprising a source of a periodic signal, amplifier means connected to said signal source for amplifying said periodic signal, meter means adapted to produce an indication directly related to the frequency of said periodic signal, and threshold means energized by said amplified signal and applying said amplified signal to said meter means, said threshold means comprising a transformer having a primary winding connected to the output of said amplifier means, first diode means, a network including a resistance in parallel with a capacitor, said network having a time constant which is long in realtion to the period of said periodic signal, the secondary winding of said transformer, said diode and said network being connected seriatim across said voltage source, transistor means having at least emitter base and collector, said emitter and base terminals being connected across a portion of said secondary winding to provide a signal input to said transistor, resistance means connecting said collector to the terminal of said voltage source to which said network is connected, a capacitance, and second diode means, said capacitance and said second diode means being connected seriatim between said collector and the connection between said first diode means and said network, said first and second diode means having a common polarity with respect to said voltage source, said meter means being operatively connected to the common connection of said capacitance and said second diode means.

3. Apparatus energized from a D.C. voltage source for measuring the frequency of a periodic signal comprising a source of a periodic signal, amplifier means connected to said signal source for amplifying said signal, meter means adapted to produce an indication directly related to the frequency of said periodic signal, said meter means comprising means converting said periodic signal into periodic substantially square pulses, means differentiating said square pulses to produce spaced substantially identical impulses irrespective of the periodicity thereof over a predetermined range, indicator means responsive to said impulses to indicate said periodicity, and threshold means energized by said amplified signal and applying said amplified signal to said meter means, said threshold means comprising a transformer having a primary winding connected to the output of said amplifier means, first diode means, a network including a resistance in parallel with a capacitor, said network having a time constant which is long in relation to the period of said periodic signal, the secondary winding of said transformer, said diode and said network being connected seriatim across said voltage source, transistor means having at least emitter base and collector, said emitter and base being connected across a portion of said secondary winding to provide a signal input to said transistor, resistance means connecting said collector to the terminal of said source to which said network is connected, a capacitance, and second diode means, said capacitance and said second diode means being connected seriatim between said collector and the connection between said first diode means and said network, said first and second diode means having a common polarity with respect to said voltage source, said meter means being operatively connected to the common connection of said capacitance and said second diode means.

4. Apparatus energized from a D.C. voltage source for measuring the frequency of a periodic signal comprising a source of a periodic signal, amplifier means connected to said signal source for amplifying said signal, meter means adapted to produce an indication directly related to the frequency of said periodic signal, said meter means comprising means converting said periodic signal into periodic substantially square pulses, means differentiating said square pulses to produce spaced substantially identical impulses irrespective of the periodicity thereof over a predetermined range, a direct current meter, resistance means and a known capacitor connected in parallel to form a sensing network, one terminal of said sensing network being energized with said impulses, and means connecting an intermediate portion of said voltage resistance means to said source, and threshold means energized by said amplified signal and applying said amplified signal to said meter means, said threshold means comprising a transformer having a primary winding connected to the output of said amplifier means, first diode means, a network including a resistance in parallel with a capacitor, said network having a time constant which is long in relation to the period of said periodic signal, the secondary winding of said first transformer, said diode means and said network being connected seriatim across said voltage source, transistor means having at least emitter base and collector, said emitter and base being connected across a portion of said secondary winding to provide a signal input to said transistor, resistance means connecting said collector to the terminal of said voltage source to which said network is connected, a capacitance, and second diode means, said capacitance and said second diode means being connected seriatim between said collector and the connection between said first diode means and said network, said first and second diode means having a common polarity, said meter means being operatively connected to the common connection of said capacitance and said second diode means.

5. A threshold circuit for a periodic signal, said threshold circuit comprising a source of a periodic signal, a network including a resistor and a capacitor connected in parallel, said network having a time constant which is long in relation to the period of said periodic signal, first and second diode means each having a terminal of common polarity connected to one terminal of said network, amplifier means connected to said source for amplifying said signal, means applying said amplified signal to said network through said second diode means to charge said capacitor, and means connecting said source to said first diode to bypass said periodic signal input whenever said large capacitor is substantially discharged.

6. A threshold circuit for a periodic signal, said threshold circuit comprising a source of a periodic signal, a network including a resistor and a capacitor connected in parallel, said network having a time constant which is long in relation to the period of said periodic signal, first and second diode means each having a terminal of common polarity connected to one terminal of said network, amplifier means having an input and having an amplified signal output, means applying said amplified signal output to said network through said second diode means to charge said capacitor, step-up transformer means having a primary winding connected to said source and a secondary winding connected to said first diode means in series, and means coupling a portion of said secondary winding means to the input of said amplifier means.

7. A threshold circuit for a periodic signal, said threshold circuit being energized from a source of D.C. voltage and comprising a source of a periodic signal, a network including a resistor and a capacitor connected in parallel, said network having a time constant which is long in relation to the period of said periodic signal, first diode means, transformer means having a primary winding and a secondary winding, said network, said first diode means and said secondary winding being connected seriatim across said voltage source with polarity such that current from said voltage source may flow through said first diode means, said signal source being connected to said primary winding, amplifier means having an input connected to said secondary winding and having an output terminal, and a second diode means connected to said network with the same polarity as said first diode means and connected to said output terminal whereby the periodic signal amplified in said amplifier means charges said capacitor.

8. A threshold circuit for a periodic signal, said threshold circuit being energized from a source of D.C. voltage and comprising a source of periodic signal, a capacitance connected across said source of D.C. voltage, a network including a resistor and a capacitor connected in parallel, said network having a time constant which is long in relation to the period of said periodic signal, first diode means, transformer means having a primary winding and a secondary winding, said network, said first diode means and said secondary winding being connected seriatim across said voltage source with polarity such that current from said voltage source may flow through said first diode means, said signal source being connected to said primary winding, amplifier means having an input connected to said secondary winding and having an output terminal, and a second diode means connected to said network with the same polarity as said first diode means and connected to said output terminal whereby the periodic signal amplified in said amplifier means charges said network capacitor.

9. A threshold circuit for a periodic signal, said threshold circuit being energized from a source of D.C. voltage and comprising a source of a periodic signal, a capacitance connected across said source, a network including a resistor and a capacitor connected in parallel, said network having a time constant which is long in relation to the period of said periodic signal, first diode means, transformer means having a primary winding and a secondary winding, said network, said first diode means and said secondary winding being connected seriatim across said voltage source with polarity such that current from said voltage source may flow through said first diode means, signal source being applied to said primary winding, amplifier means including a transistor having at least emitter, collector, and base, said emitter and base being operatively connected across a portion of said secondary winding, and a second diode means connected to said network with the same polarity as said first diode means and operatively connected to said collector, said emitter being operatively connected to said voltage source whereby the periodic signal applied to said primary winding charge said network capacitor.

10. A threshold circuit for periodic signal inputs and energized from a D.C. voltage source comprising a source of a periodic signal capacitance connected between the terminals of said D.C. source, a network including a resistor and a capacitor connected in parallel, said network having a time constant which is long in relation to the period of said periodic signal, first and second diode means, each having a terminal of a given polarity operatively connected to one terminal of said network, the other terminal of said network being operatively connected to one terminal of said voltage source, impedance means operatively connected between the other terminal of said first diode means and the other terminal of said voltage source, the polarity of said terminals being so arranged that current from said source flows through said impedance means, said first diode and said resistor whenever said periodic signal input has a magnitude less than a predetermined value, said signal source being connected to said impedance means, signal amplifying means having an input connected to said impedance means, and output impedance means connected between the other terminal of said second diode means and said other terminal of the voltage source, the output of said signal amplifying means being connected to said output impedance means whereby said periodic signal, when above said predetermined value, is amplified and charges said network capacitor through said second diode substantially reducing said current flowing through said impedance means and said first diode means.

11. A threshold circuit for periodic signal inputs and energized from a D.C. voltage source comprising a source of a periodic signal, a large capacitance connected between the terminals of said D.C. source, a network including a resistor and a capacitor connected in parallel, first and second diode means, said network having a time constant which is long in relation to the period of said periodic signal, each having a terminal of a given polarity operatively connected to one terminal of said network, the other terminal of said network being operatively connected to one terminal of said voltage source, a transformer having a primary winding and secondary winding means, said signal source being connected to said primary winding, said secondary winding means being operatively connected between the other terminal of said first diode means and the other terminal of said voltage source, the polarities being so arranged that there is current from said source through said first diode whenever said periodic signal has a value less than a predetermined magnitude, signal amplifying means having an input connected to said secondary winding means, the output of said signal amplifying means being connected to said second diode means whereby said periodic signal, when above said predetermined magnitude, charges said network capacitor through said second diode substantially reducing said current flow through said secondary winding means and said first diode means.

12. A threshold circuit for periodic signal inputs and energized from a D.C. voltage source comprising a source of a periodic signal, a capacitance connected between the terminals of said D.C. source, a network including a resistor and a capacitor connected in parallel, said network having a time constant which is long in relation to the period of said periodic signal, first and second diode means, each having a terminal of a given polarity operatively connected to one terminal of said network, the other terminal of said network being operatively connected to one terminal of said voltage source, a transformer having a primary winding and secondary winding means, said signal source being connected to said primary winding, said secondary winding means being operatively connected between the other terminal of said first diode means and the other terminal of said voltage source, the polarities being so arranged that there is current from said voltage source through said first diode whenever said periodic signal has a value less than a predetermined magnitude, signal amplifying means including a transistor having at least emitter, collector, and base, said base and emitter being connected across a portion of said secondary winding means and being operatively connected to the other terminal of said voltage source, said collector being operatively connected to said second diode means whereby said periodic signal, when above said predetermined magnitude, charges said network capacitor through said second diode substantially reducing said current flow through said secondary winding means.

References Cited in the file of this patent
UNITED STATES PATENTS

| | | |
|---|---|---|
| 2,488,417 | Lee | Nov. 15, 1949 |
| 2,555,865 | Warren | June 5, 1951 |
| 2,629,865 | Barker | Feb. 24, 1953 |
| 2,867,767 | McGillem et al. | Jan. 6, 1959 |

OTHER REFERENCES

Transistor Count Rate Systems, article in Electrical Engineering, July 1958, pp. 623–625.

UNITED STATES PATENT OFFICE
CERTIFICATE OF CORRECTION

Patent No. 3,148,328            September 8, 1964

Thomas A. Murrell et al.

It is hereby certified that error appears in the above numbered patent requiring correction and that the said Letters Patent should read as corrected below.

Column 2, line 47, after "15" strike out the comma; column 3, line 48, for "transfromer" read -- transformer --; column 5, line 74, for "charging" read -- changing --; column 9, line 54, after "said" strike out "voltage"; line 55, after "said" insert -- voltage --; line 63, strike out "first"; same line 63, after "said", second occurrence, insert -- first --; column 10, line 51, before "periodic" insert -- a --; column 11, line 14, for "charge" read -- charges --; line 18, before "capacitance" insert -- , a --; line 46, strike out "large"; same column 11, lines 49 to 51, strike out "said network having a time constant which is long in relation to the period of said periodic signal," and insert the same after "parallel," in line 48, same column 11.

Signed and sealed this 2nd day of February 1965.

(SEAL)
Attest:

ERNEST W. SWIDER            EDWARD J. BRENNER
Attesting Officer            Commissioner of Patents